(12) United States Patent
Klein

(10) Patent No.: US 8,244,937 B2
(45) Date of Patent: Aug. 14, 2012

(54) SOLID STATE STORAGE DEVICE CONTROLLER WITH PARALLEL OPERATION MODE

(75) Inventor: Dean Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 318 days.

(21) Appl. No.: 12/241,636

(22) Filed: Sep. 30, 2008

(65) Prior Publication Data
US 2010/0082857 A1   Apr. 1, 2010

(51) Int. Cl.
*G06F 5/00* (2006.01)
(52) U.S. Cl. ......................... 710/51
(58) Field of Classification Search .......... 710/51
See application file for complete search history.

(56) References Cited

U.S. PATENT DOCUMENTS

| | | | |
|---|---|---|---|
| 5,463,643 A * | 10/1995 | Gaskins et al. | 714/766 |
| 6,813,678 B1 | 11/2004 | Sinclair et al. | |
| 2005/0154288 A1 * | 7/2005 | Wang et al. | 600/407 |
| 2005/0169061 A1 * | 8/2005 | Sohn et al. | 365/189.03 |
| 2007/0198856 A1 * | 8/2007 | Lee et al. | 713/190 |
| 2009/0307389 A1 * | 12/2009 | Sprouse et al. | 710/36 |
| 2010/0095053 A1 * | 4/2010 | Bruce et al. | 711/103 |

OTHER PUBLICATIONS

Agrawal et al., "Design Tradeoff for SSD Performance", USENIX '08: 2008 USENIX Annual Technical Conference, pp. 57-70.

* cited by examiner

*Primary Examiner* — Henry Tsai
*Assistant Examiner* — Juanito Borromeo
(74) *Attorney, Agent, or Firm* — Leffert Jay & Polglaze, P.A.

(57) ABSTRACT

Solid state storage devices and methods for operation of solid state storage devices are disclosed. In one such method, a master memory controller is comprised of a plurality of memory communication channels. At least one of the memory communication channels is used to communicate with one or more slave memory controllers. The master and slave memory controllers can operate in a parallel operation mode to communicate with a plurality of memory devices coupled to the memory communication channels of each memory controller.

20 Claims, 7 Drawing Sheets

SOLID STATE STORAGE DEVICE CONTROLLER WITH PARALLEL OPERATION MODE

TECHNICAL FIELD OF THE INVENTION

The present invention relates generally to memory devices and in a particular embodiment the present invention relates to non-volatile memory devices.

BACKGROUND OF THE INVENTION

Memory devices can include internal, semiconductor, integrated circuits in computers or other electronic devices. There are many different types of memory including random-access memory (RAM), read only memory (ROM), dynamic random access memory (DRAM), static RAM (SRAM), synchronous dynamic RAM (SDRAM), and non-volatile memory.

Non-volatile memory devices (e.g., flash memory) have developed into a popular source of non-volatile memory for a wide range of electronic applications. Flash memory devices typically use a one-transistor memory cell that allows for high memory densities, high reliability, and low power consumption. Common uses for flash memory include personal computers, personal digital assistants (PDAs), digital cameras, and cellular telephones. Program code and system data such as a basic input/output system (BIOS) are typically stored in flash memory devices for use in personal computer systems.

Non-volatile memory devices are also incorporated into solid state storage devices such as solid state drives. Solid state drives can be used in computers to replace the hard disk drives that typically have used magnetic or optical disks for storing large amounts of data. A solid state drive does not use moving parts whereas a hard disk drive requires a complex and sensitive drive and read/write head assembly to interact with the magnetic/optical disk. Thus, the solid state drives are more resistant to damage and loss of data through vibration and impacts.

Figure 1:
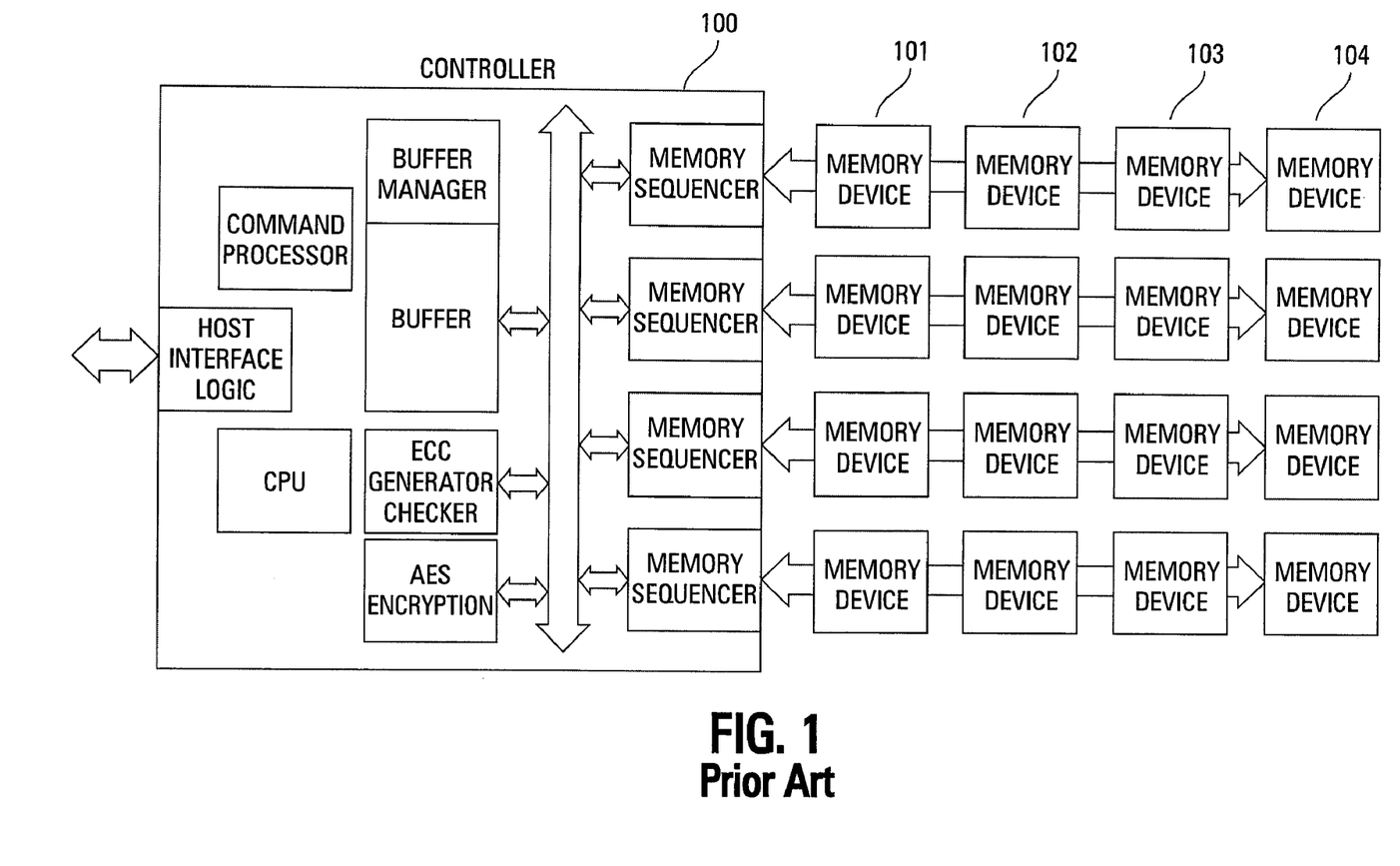
FIG. 1 shows a typical prior art solid state storage device.

FIG. 1 illustrates one typical prior art solid state storage device with four channels between a controller and the memory devices. In this example, one channel is comprised of four stacked memory devices 101-104 that is connected to the controller 100.

One drawback to current solid state drive technology is achieving the memory density necessary to adequately and cost effectively replace a computer's hard disk drive. Most modern computers require the capability for storing very large amounts of data (e.g., 250 GB or more) due to digital images, movies, and audio files. Thus, an effective solid state drive should have a memory density approaching a typical hard drive, remain cost competitive, and still fit within the constantly decreasing thickness of a laptop computer or within the constraints of an enterprise storage system, for example.

For the reasons stated above, and for other reasons stated below that will become apparent to those skilled in the art upon reading and understanding the present specification, there is a need in the art for a way to increase the memory density of a solid state drive while maintaining or reducing the size.

DETAILED DESCRIPTION

In the following detailed description of the invention, reference is made to the accompanying drawings that form a part hereof and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

Figure 2:
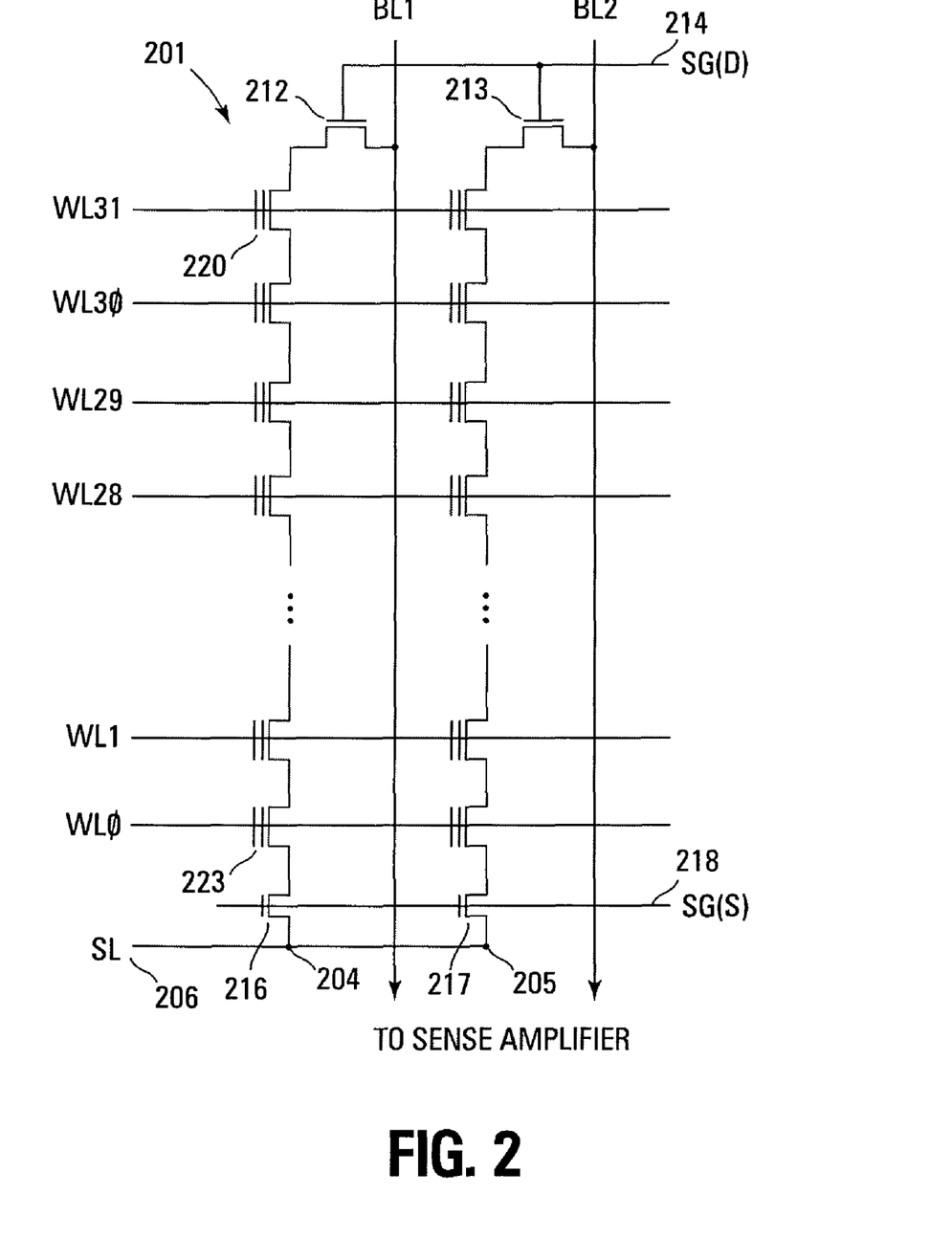
FIG. 2 shows a schematic diagram of one embodiment of a portion of a non-volatile memory array in accordance with the non-volatile memory device of FIG. 3.

FIG. 2 illustrates a schematic diagram of a portion of a NAND architecture memory array comprising series strings of non-volatile memory cells. While the subsequent discussions refer to a NAND memory device, the present embodiments are not limited to such an architecture but can be used in other memory device architectures as well.

The memory array is comprised of an array of non-volatile memory cells 201 (e.g., floating gate) arranged in columns such as series strings 204, 205. Each of the cells 201 are coupled drain to source in each series string 204, 205. An access line (e.g. word line) WL0-WL31 that spans across multiple series strings 204, 205 is connected to the control gates of each memory cell in a row in order to bias the control gates of the memory cells in the row. Data lines, such as bit lines BL1, BL2 are eventually connected to sense amplifiers (not shown) that detect the state of each cell by sensing current on a particular bit line.

Each series string 204, 205 of memory cells is coupled to a source line 206 by a source select gate 216, 217 and to an individual bit line BL1, BL2 by a drain select gate 212, 213. The source select gates 216, 217 are controlled by a source select gate control line SG(S) 218 coupled to their control gates. The drain select gates 212, 213 are controlled by a drain select gate control line SG(D) 214.

Each memory cell can be programmed as a single level cell (SLC) or multilevel cell (MLC). Each cell's threshold voltage ($V_t$) is indicative of the data that is stored in the cell. For example, in an SLC, a $V_t$ of 0.5V might indicate a programmed cell while a $V_t$ of −0.5V might indicate an erased cell. The MLC may have multiple $V_t$ windows that each indicate a different state. Multilevel cells can take advantage of the analog nature of a traditional flash cell by assigning a bit pattern to a specific voltage range stored on the cell. This technology permits the storage of two or more bits per cell, depending on the quantity of voltage ranges assigned to the cell.

Figure 3:
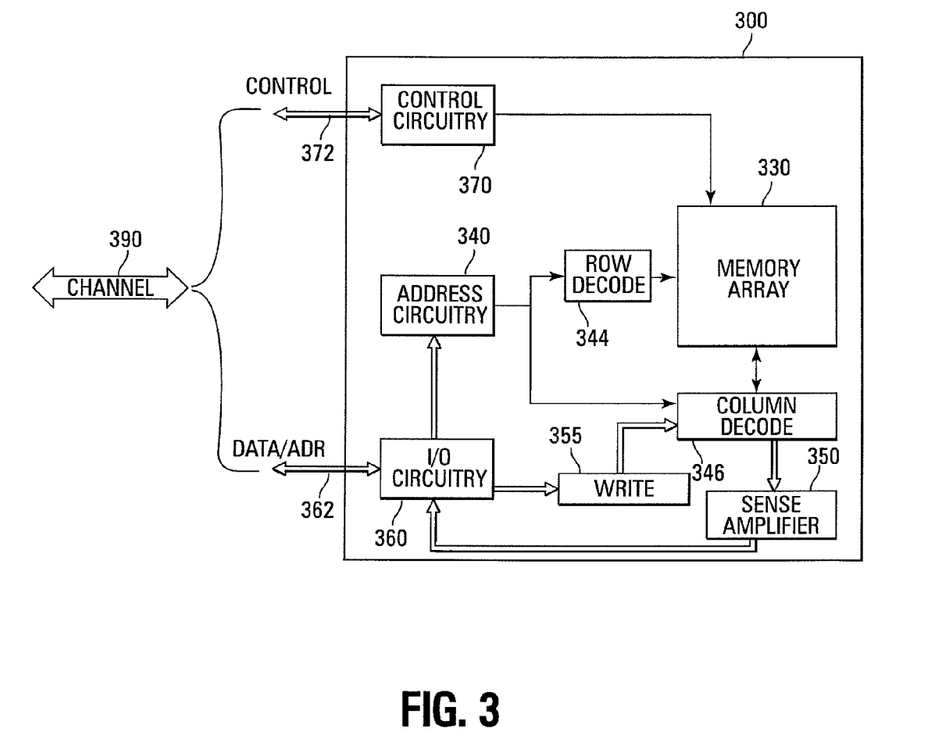
FIG. 3 shows a block diagram of one embodiment of a non-volatile memory device that incorporates the memory array of FIG. 2.

FIG. 3 illustrates a functional block diagram of a non-volatile memory device 300 that can be incorporated on an integrated circuit die. The non-volatile memory device 300, in one embodiment, is flash memory. The non-volatile memory device 300 has been simplified to focus on features of the memory that are helpful in understanding the present programming embodiments.

The non-volatile memory device 300 includes an array 330 of non-volatile memory cells such as the floating gate memory cells that are illustrated in FIG. 2 and discussed previously. The memory array 330 is arranged in banks of word line rows and bit line columns. In one embodiment, the columns of the memory array 330 are comprised of series strings of memory cells. As is well known in the art, the connections of the cells to the bit lines determines whether the array is a NAND architecture, an AND architecture, or a NOR architecture.

The memory array 330 can be organized into memory blocks. The quantity of memory blocks is typically determined by the size of the memory device (i.e., 512 MB, 1 GB). In one embodiment, each memory block is organized into 64 pages.

Address buffer circuitry 340 is provided to latch address signals provided through the I/O circuitry 360. Address signals are received and decoded by a row decoder 344 and a column decoder 346 to access the memory array 330. It will be appreciated by those skilled in the art, with the benefit of the present description, that the number of address input connections depends on the density and architecture of the memory array 330. That is, the number of addresses increases with both increased memory cell counts and increased bank and block counts. Data is also input and output through the I/O circuitry 360 based on the timing of the control signals 372.

The non-volatile memory device 300 reads data in the memory array 330 by sensing voltage or current changes in the memory array columns using sense amplifier circuitry 350. The sense amplifier circuitry 350, in one embodiment, is coupled to read and latch a row of data from the memory array 330. Data input and output buffer circuitry 360 is included for bidirectional data communication as well as address communication over a plurality of data connections 362 with an external controller. Write circuitry 355 is provided to write data to the memory array.

The memory control circuitry 370 decodes signals provided on control bus 372 from an external controller. These signals can include read/write (R/W), chip enable (CE), command latch enable (CLE), address latch enable (ALE) as well as other control signals that are used to control the operations on the memory array 330 as well as other circuitry of the memory device 300. In one embodiment, these signals are active low but alternate embodiments can use active high signals. The memory control circuitry 370 may be a state machine, a sequencer, or some other type of controller to generate the memory control signals.

The non-volatile memory device 300 communicates with an external controller over a channel 390. In one embodiment, the channel 390 is comprised of the memory address, data, and control signals between the external controller and the memory device 300. The embodiment of FIG. 3 shows the address and data being coupled as one bus to the I/O circuitry 360. In an alternate embodiment, the address and data buses are separate inputs/outputs with the memory device 300.

Figure 4:
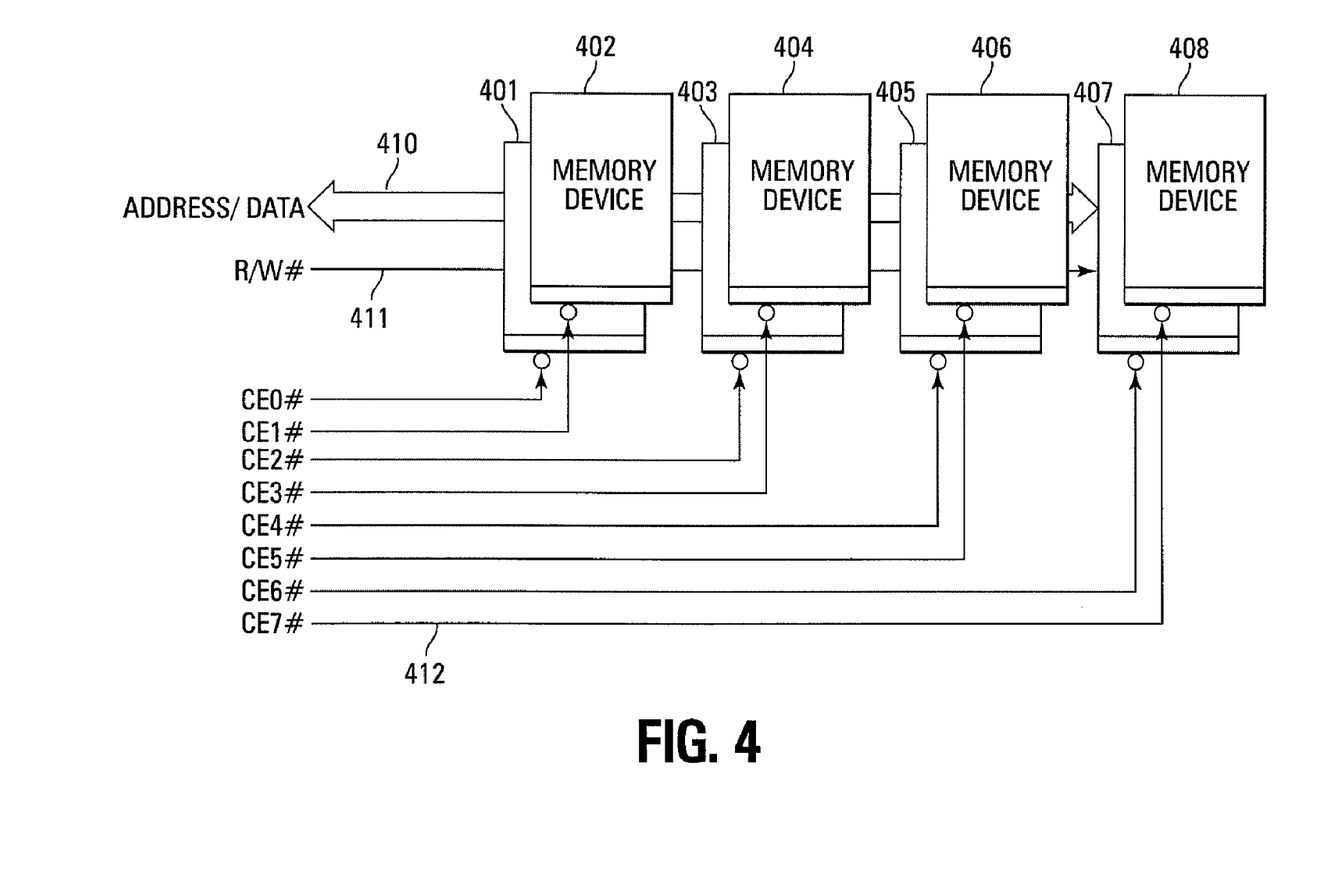
FIG. 4 shows a block diagram of one embodiment of a plurality of non-volatile memory devices, in accordance with FIG. 3, that make up one or more channels of a solid state storage device.

FIG. 4 illustrates a block diagram of one embodiment of a plurality of memory devices 401-408 that can make up one or more communication channels in a solid state storage device. This figure shows the address/data bus 410, Read/Write control signal 411, and chip select signals 412 that make up the one or more communication channels. The illustrated embodiment includes eight separate memory devices so that eight chip enable signals ($\overline{CE0}$-$\overline{CE7}$) are used. Each memory device 401-408 is formed on a separate die and stacked with one or more of the other memory devices to form the solid state storage device.

The embodiment of FIG. 4 is for purposes of illustration only. A solid state storage device may use only one memory device 401 or multiple memory devices. For example, a solid state storage device could be comprised of multiples of two memory devices 401, 402 in which each pair of memory devices shares a common communication channel including a single chip enable line.

Figure 5:
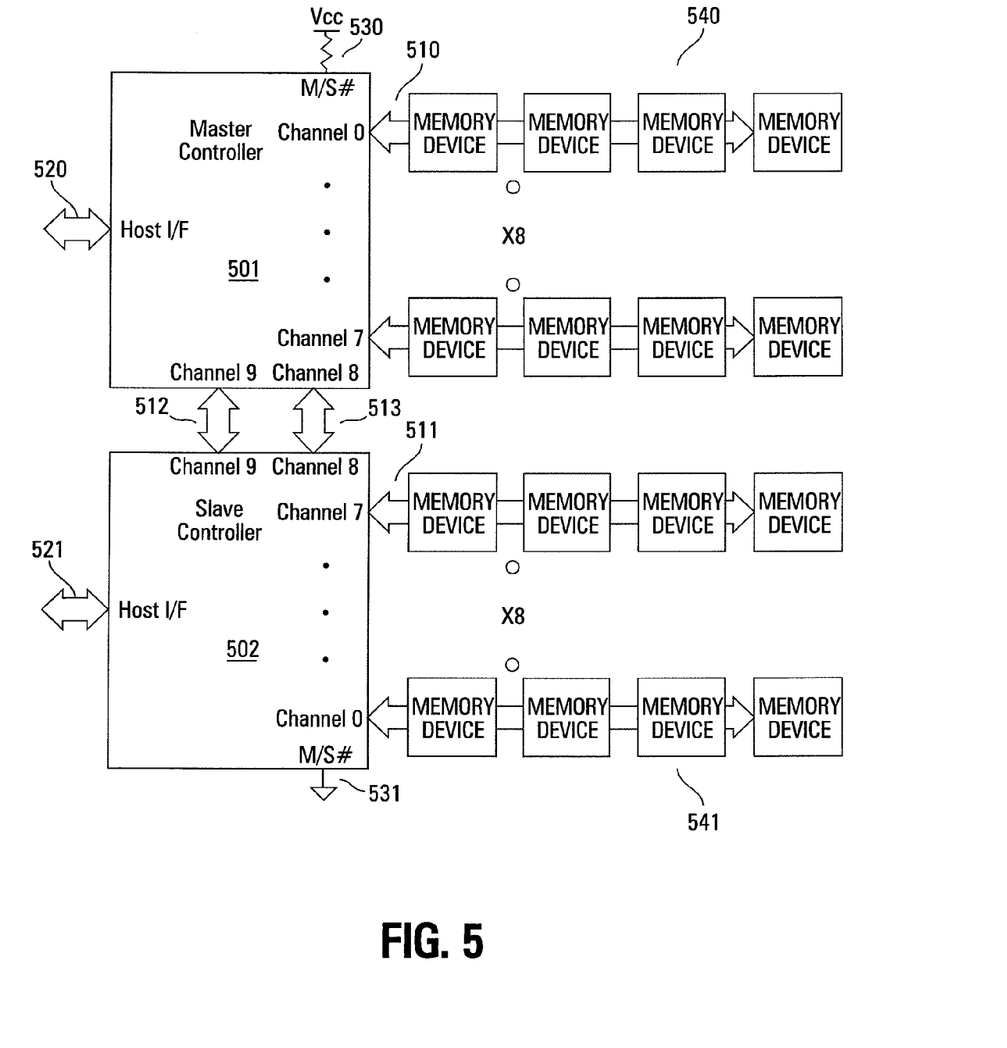
FIG. 5 shows a block diagram of one embodiment of a solid state storage device that incorporates the solid state storage device controller having a parallel operation mode.

FIG. 5 illustrates a block diagram of one embodiment of a solid state storage device that uses a controller having a parallel operation mode. The embodiment of FIG. 5 shows two controllers 501, 502. The top controller is the master controller 501 and the bottom controller is the slave controller 502. The present embodiments are not limited to any certain quantity of controllers since additional channels of the master controller 501 can be used to communicate with additional slave controllers.

Each controller 501, 502 is configured with a host interface 520, 521 over which the controller communicates with external devices/systems such as computers and cameras. The host interface 520, 521 can be parallel ATA, SATA, SAS, PCIe, Fiber Channel, SCSI, Gigabit Ethernet, or some other communication standard channel.

Use of the host interface 521 for the slave controller is not necessary for proper operation of the solid state storage device of FIG. 5. In one embodiment, the slave controller's host interface 521 provides a redundant connection to the storage device. In another embodiment, both host interfaces 520, 521 are used simultaneously such as to increase data throughput for the device.

Each controller 501, 502 includes a mode select input 530, 531 that determines whether the controller operates as a master or a slave. The mode select input 530, 531 enables the controllers to be virtually identical so that the manufacturer is not required to manufacture and track different types of controllers.

In the illustrated embodiment, a logical high signal on the mode select input 530 causes the top controller 501 to operate in the master mode. The logical high signal is generated by pulling up the mode select input 530 to $V_{CC}$ through a resistor. A logical low signal on the mode select input 531 causes the bottom controller 502 to operate in the slave mode. The logical low signal is generated by connected the mode select input 531 to ground potential.

Each controller 501, 502 is further comprised of communication channels 510, 511 as discussed previously. In the illustrated embodiment, each channel is used to communicate with four stacked memory devices 540, 541. However, the number of memory devices used in each channel is not limited to four. Alternate embodiments can use more or less memory devices. There are, however, limitations to the number of devices which may be placed on a memory channel. These limitations arise from the loading of the channel and the addressing of devices on the channel. Loading limitations occur because each device on a channel presents an electrical load, primarily capacitive, on the channel. Adding capacitance to the channel requires a corresponding increase in channel drive current, or the speed of the channel must be lowered.

Channels 0-7 in each controller 501, 502 are used to communicate with the memory devices 540, 541. Channels 8 and 9 512, 513 of each controller 501, 502 are used to communicate with the other controller 501, 502. Alternate embodiments can use different channels for communicating with the memory devices and different channels for communicating between controllers.

The communication between the controllers 501, 502 enables the controllers to operate in a parallel mode. While the master controller 501 is communicating with its memory devices 540, the slave controller 502 can be communicating with its memory devices 541. The two common communication channels 512, 513 between the controllers 501, 502 enable the master controller 501 to send operating instructions to the slave controller 502. The common channels 512, 513 also enable the master controller 501 to send data, addresses, and control signals that are addressed to the memory devices that are controlled by the slave controller 502.

If the host interface 521 of the slave controller 502 is not used or not able to be used, the slave controller 502 can transmit data read from the memory devices 541 to the master controller 501 for output through the host interface 520. Similarly, the master controller 501 can transmit data to the slave controller 502, through the shared communication channels 512, 513, to be stored in the memory devices 541 of the slave controller 502.

In order to increase the capacity of the solid state storage device, two or more additional communication channels from the master controller 501 and/or the slave controller 502 can be used for one or more additional slave controllers to operate in parallel with the other controllers 501, 502. Since each slave controller has the potential to communicate with eight communication channels, the memory capacity of the solid state storage device can be greatly increased by adding additional slave controllers operating in the parallel mode.

Figure 6:
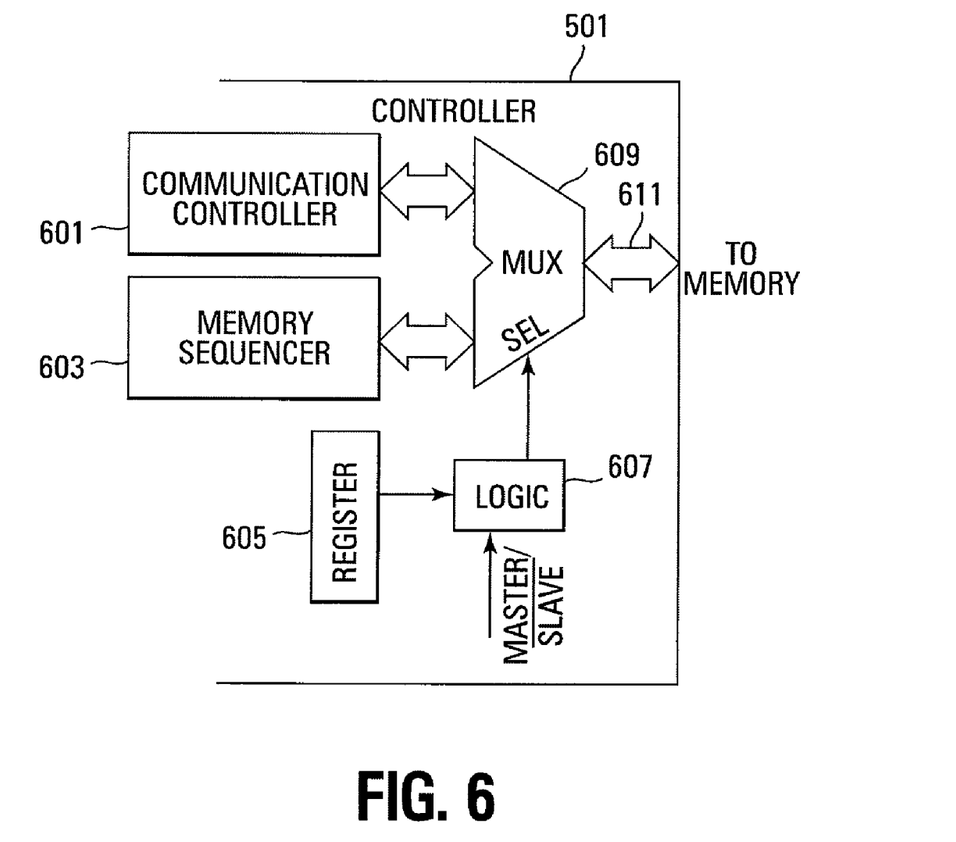
FIG. 6 shows a logical representation of the solid state storage device controller in accordance with FIG. 5.

FIG. 6 illustrates a logical representation of one embodiment of a solid state storage device controller 501 of FIG. 5. The illustrated controller can be configured to operate in a parallel operation mode so that one controller can be a master controller while one or more additional controllers can operate as slave controllers in parallel with the master controller. While the master controller 501 is subsequently discussed, the embodiment of FIG. 6 applies to any controller, master or slave, since they can be identical except for the mode set by the mode select input (e.g., master/$\overline{\text{slave}}$).

The controller is comprised of a communication controller block 601 that generates the control signals for the memory devices. As previously discussed, these control signals can include the chip enable and read/write signals as well as other memory control signals.

A memory sequencer block 603 generates the timing and commands necessary for operation of the memory devices. The sequencer block 603 controls an access process to write and/or read the memory devices on each channel. For example, the sequencer block 603 can generate the control signals that control the select gate drain and select gate source transistors as described with reference to FIG. 2. The sequencer block 603 is also responsible for generating many other memory control signals.

A multiplexer circuit 609 selects between the output of the communication controller 601 and the output of the memory sequencer 603 and outputs the selected input over the memory communication channel 611. The select control input of the multiplexer 609 is generated by a register 605, logic 607, and the input master/$\overline{\text{slave}}$ signal.

The register 605, in one embodiment, is a one bit storage device such as a flip-flop. The register 605 is set and reset (i.e., logical "1" and logical "0" respectively) by other circuitry of the memory controller 501. One state is used to select the communication controller 601 and the other state is used to select the memory sequencer 603.

The logic circuit 607 is responsible for combining the register 605 output and the master/$\overline{\text{slave}}$ mode select signal. The output of the logic circuit 607 is the multiplexer 609 select signal. The actual circuit used in the logic circuit 607 is not shown since multiple different circuits can be used to achieve the same result.

In one embodiment of operation, the parallel mode output signal from the logic 607 is derived from the contents of the register 605 if the master/$\overline{\text{slave}}$ signal indicates a logical high for the master mode. In this case, the content of the register (e.g., logical "0" or logical "1") is used to select either the memory sequencer 603 or the communication controller 601 through the multiplexer select signal. If the master/$\overline{\text{slave}}$ signal is a logical low for the slave mode, the logic block 607 forces the multiplexer 609 to select only the memory sequencer 603.

The embodiment illustrated in FIG. 6 illustrates only portions of the controller relevant to understanding the operation of the controller with the memory devices. It can be understood by one skilled in the art that the controller may be comprised of additional functional blocks.

Figure 7:
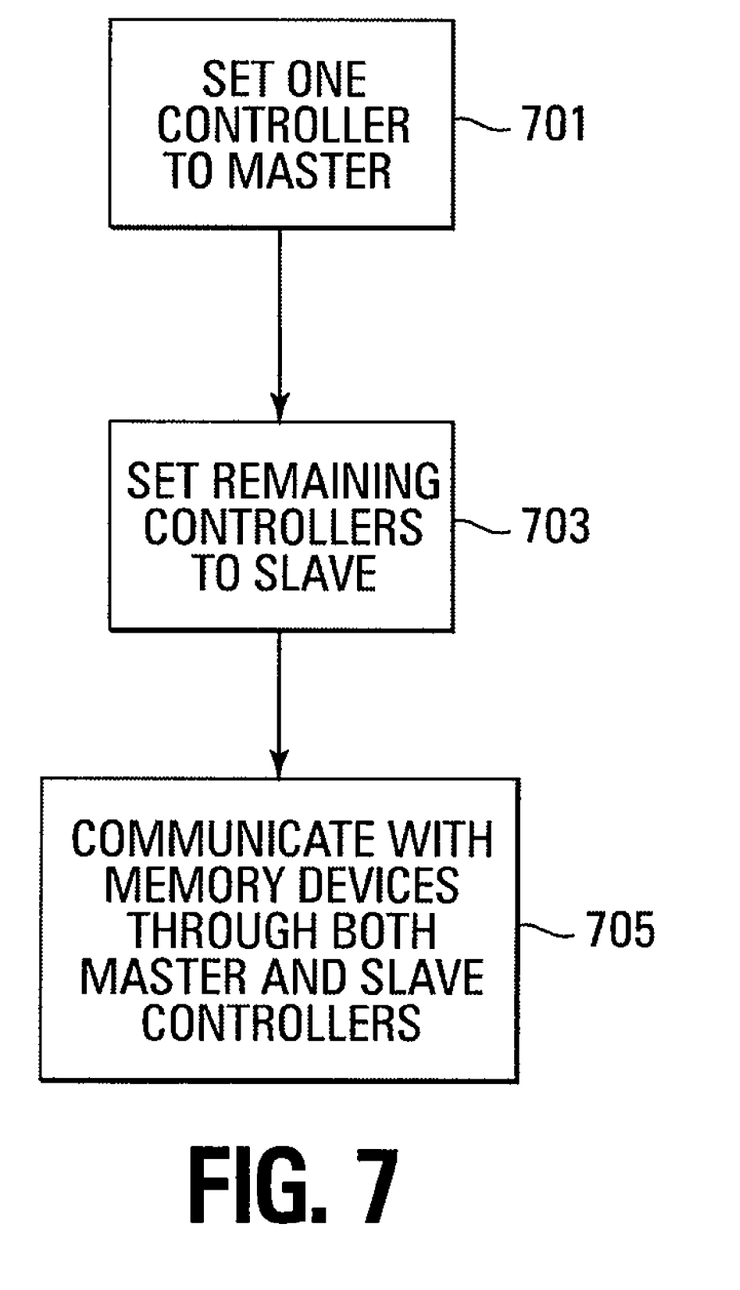
FIG. 7 shows a flowchart of one embodiment of a method for operation of a solid state storage device controller having a parallel operation mode.

FIG. 7 illustrates a flowchart of one embodiment of a method for operation of a solid state storage device controller having a parallel operation mode. One of the controllers of the solid state storage device is set to be the master controller 701 and the remaining controllers are set to be slave controllers 703. This can be hardwired as illustrated in FIG. 5 with the pull-up and pull-down connections. In an alternate embodiment, the master and slave functions can be selectable through a software command from a controller.

Once the functions of the memory controllers are set, communication is performed with the memory devices through both the master and slave controllers 705. The master and slave controllers are now operating in the parallel operation mode.

CONCLUSION

In summary, one or more embodiments enable a solid state storage device controller to operate in a parallel operation mode. By using communication channels from a master controller to communicate with slave controllers, the memory density of a solid state storage device can be increased.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A solid state storage device comprising:
   a plurality of memory controllers that operate in a parallel operation mode, each controller having a memory sequencer, a communication controller, and a plurality of memory communication channels, each memory communication channel configured to communicate with memory devices, wherein one of the memory controllers is a master controller and remaining memory controllers are slave controllers to the master controller and the plurality of memory controllers are coupled together over at least one of the memory communication channels; and a plurality of memory devices coupled to the plurality of memory communication channels for each memory controller;

wherein only one memory controller of the plurality of memory controllers is configured to select both the memory sequencer and the communication controller while the remaining memory controllers select only the memory sequencer.

2. The device of claim 1 wherein each memory communication channel is comprised of data lines, address lines, and control lines.

3. The device of claim 1 wherein the plurality of memory devices are organized into groups of memory devices and each group is coupled to a different memory communication channel.

4. The device of claim 1 wherein the parallel operation mode is selected by a command.

5. The device of claim 1 wherein the parallel operation mode is hardwired in each of the plurality of memory controllers.

6. A solid state storage device comprising:
a master memory controller having a memory sequencer, a communication controller, and a first plurality of memory communication channels, each memory communication channel configured to communicate with a plurality of memory devices wherein the master controller is configured to select both the memory sequencer and the communication controller;
at least one slave memory controller that is a slave to the master memory controller and having a memory sequencer, a communication controller, and a second plurality of memory communication channels wherein at least one of the second plurality of memory communication channels is coupled to at least one of the first plurality of memory communication channels as a common communication channel wherein each slave memory controller is configured to select only the memory sequencer;
a first plurality of memory devices coupled to the first plurality of memory communication channels; and
a second plurality of memory devices coupled to the second plurality of memory communication channels;
wherein the master memory controller and the at least one slave memory controller operate in a parallel operation mode.

7. The device of claim 6 wherein each of the plurality of memory devices is a NAND flash memory device.

8. The device of claim 6 wherein the master controller is configured to transmit commands, over the common communication channel, to the at least one slave memory controller for controlling operation of the at least one slave memory controller.

9. The device of claim 6 wherein each memory communication channel of the first plurality of memory communication channels, except the common communication channel, is coupled to a subset of memory devices of the plurality of memory devices.

10. The device of claim 6 wherein each of the first plurality of memory communication channels, except the common communication channel, is coupled to the same quantity of memory devices of the first plurality of memory devices and each of the second plurality of memory communication channels, except the common communication channel, is coupled to the same quantity of memory devices of the second plurality of memory devices.

11. The device of claim 6 wherein the common communication channel is comprised of two of the first plurality of memory communication channels coupled to two of the second plurality of memory communication channels.

12. The device of claim 6 wherein each memory communication channel comprises a different chip enable signal for each memory device coupled to a memory communication channel.

13. The device of claim 6 wherein each memory device is comprised of an array of floating gate memory cells organized in a NAND architecture and coupled to memory control circuitry.

14. The device of claim 6 wherein the master memory controller comprises a host interface for communication with an external device.

15. The device of claim 14 wherein the host interface is comprised of one of SATA, parallel ATA, SAS, PCIe, Fiber Channel, SCSI, or Gigabit Ethernet.

16. The device of claim 14 wherein the at least one slave memory controller comprises a host interface for communication with an external system in parallel with the host interface of the master memory controller.

17. The device of claim 14 wherein the host interface comprises address, data, and commands communicated between the solid state memory device and the external system.

18. A method for operation of a solid state storage device, the method comprising:
setting one of a plurality of memory controllers, operating in a parallel operation mode, to be a master controller, each of the plurality of memory controllers comprising a memory sequencer, a communication controller, and a plurality of communication channels, each memory communication channel configured to communicate with a plurality of memory devices;
setting the remaining memory controllers of the plurality of memory controllers to be slave controllers of the master controller that are coupled to the master controller through at least one of the plurality of memory communication channels;
selecting both the memory sequencer and the communication controller in the master controller and only the memory sequencer in each of the slave controllers; and
communicating with at least one memory device of a plurality of memory devices coupled to each memory communication channel for each of the plurality of memory controllers.

19. A solid state storage device comprising:
a plurality of memory controllers configured to operate in a parallel operation mode, each controller having a plurality of memory communication channels, each memory communication channel configured to communicate with a plurality of memory devices, coupled through a multiplexer circuit wherein the plurality of memory controllers are coupled together over at least one of the memory communication channels, each controller further comprising a communication controller and a memory sequencer coupled to the multiplexer circuit wherein a mode select input of the multiplexer circuit determines whether each controller is a master controller or a slave controller such that the master controller selects both the communication controller and the memory sequencer and each slave controller is a slave to the master controller and selects only the memory sequencer; and a plurality of memory devices coupled to the memory communication channels.

20. The solid state storage device of claim 19 and further comprising a register and logic coupled between the mode select input and the multiplexer circuit.

* * * * *